United States Patent [19]
Tissier et al.

[11] Patent Number: 5,103,104
[45] Date of Patent: Apr. 7, 1992

[54] PROCESS FOR MEASURING THE DIMENSIONS OF A SPACER

[75] Inventors: Annie Tissier, Saint Ismier; Jean Galvier, Saint Martin d'Heres, both of France

[73] Assignee: French State, Minister of Post, Telecommunications and Space, Issy les Moulineaux, France

[21] Appl. No.: 631,733

[22] Filed: Dec. 20, 1990

[30] Foreign Application Priority Data

Dec. 21, 1989 [FR] France .................. 89 17387

[51] Int. Cl.$^5$ .................................. G01N 21/86
[52] U.S. Cl. ............................. 250/560; 356/376
[58] Field of Search ............ 250/560, 561; 356/376, 356/379, 383, 384

[56] References Cited

U.S. PATENT DOCUMENTS

| | | | |
|---|---|---|---|
| 4,690,565 | 9/1987 | Kato et al. | 356/384 |
| 4,835,385 | 5/1989 | Kato et al. | 250/560 |
| 4,842,411 | 6/1989 | Wood | 356/376 |
| 4,949,024 | 8/1990 | Matsuura | 356/376 |
| 5,024,949 | 8/1991 | Greenberg et al. | 356/376 |

OTHER PUBLICATIONS

Publication, IBM Technical Disclosure Bulletin, "System to Satisfy the Residual First Quartz Process Requirement", vol. 21, No. 11, Apr. 1979, by Ananthakrishnan.

Publication, Patent Abstracts of Japan, "Measuring Method for Rate of Removal of Coating Film", by Kamidera, vol. 5, No. 201, Dec. 19, 1981.

*Primary Examiner*—David C. Nelms
*Assistant Examiner*—S. Allen
*Attorney, Agent, or Firm*—Lowe, Price, LeBlanc & Becker

[57] ABSTRACT

A process for measuring the dimensions of a spacer consisting in forming in a substrate (1) an array of parallel stripes (2), having a rectangular cross section; forming spacers (7) on the lateral edges (6) of the parallel stripes (2); lighting the array through a monochromatic light beam to supply a diffraction pattern, the envelope of which exhibits a major lobe and secondary lobes; measuring the sum of light intensities of a predetermined number of spots pertaining to the first secondary lobe; and deducting therefrom the width l and angle $\theta$ of the spacer (7) according to the following formulas:

$$l = k1 \times IL1 + k2$$

$$\theta = k3 \times IL1 + k4$$

2 Claims, 2 Drawing Sheets

PROCESS FOR MEASURING THE DIMENSIONS OF A SPACER

BACKGROUND OF THE INVENTION

The present invention relates to a process for measuring the characteristic dimensions of a spacer or analog used in particular during the manufacturing of some integrated circuits.

The invention especially applies to the field of integrated circuits where it is useful in quality control operations during the manufacturing.

While manufacturing integrated circuits, it may be necessary to constitute specific structures called "spacers".

A spacer is formed by a residue of a given material, exclusively located against the vertical lateral edges of the structures present at the step of the spacer manufacturing.

In order to form spacers, a layer of a given material having a uniform thickness is deposited on the wafer being manufactured, then this layer is anisotropically etched. The etching operation of this layer is stopped as soon as the areas thereof placed on the horizontal or oblique portions of the underlying structures are entirely removed. Under those conditions, the portions of this layer located against the vertical lateral edges of the underlying structures are only partially etched and therefore leave locally in place a flange having a very small width which constitutes the spacer. This technique essentially has the advantage to provide self-aligned microstructures, without masking and photoetching operations. Spacers have several applications in microelectronics, in particular during the realization of lightly doped drains, corresponding to the so-called LDD technique, during silicide deposition on drains, sources and gates without shorting between these parts, or in order to attenuate steps for allowing better passage of the overlying layers.

In all cases when spacers are to be formed, it is necessary to control, during manufacturing, the geometric shapes of the spacers and to be able to measure some specific dimensions. These controls are all the more necessary as the technologic operations leading to formation of spacers are difficult to control and are submitted to drifts, particularly due to the fact that the etching operation has to be abruptly interrupted. Should etching be interrupted too early or too late, or should the etching rate be higher or lower than the rate provided for, the resulting spacer no longer exhibits the suitable shape or dimensions.

A known process for controlling the shape and dimensions of spacers consists in breaking a wafer at right angles to spacers and to examine the cross section through an electronic microscope. This method is expensive, time consuming and critical. Moreover, it is destructive. Up to now, no reliable, non-destructive and immediate process is known for controlling spacers.

Thus, an object of the invention is to provide a process that permits measuring the charateristic dimensions of spacers.

SUMMARY OF THE INVENTION

To achieve these objects, the invention provides a process for measuring dimensions of a spacer consisting in:

forming on a substrate an array of parallel stripes, each stripe having a rectangular cross section;

forming spacers on the lateral edges of the lateral stripes, these spacers exhibiting, according to a cross section, a width l corresponding to the distance separating the edge of the stripe and the external edge of the spacer at the substrate, and an angle $\theta$ formed, with the substrate plane, by the tangent at the external edge of the spacer on the substrate;

during the manufacturing step of spacers or after this step, lighting the array with a monochromatic light beam, the diffracted light of which produces a diffraction pattern made of a main light spot corresponding to the specular reflection and of a multiplicity of aligned and adjacent diffraction spots, the envelope of which exhibits a major lobe including the main spot and secondary lobes among which the first lobe is adjacent to the major lobe;

measuring the sum of the light intensities of a predetermined number of spots pertaining to the first lobe; and deducting therefrom the width l and angle $\theta$ of the spacer according to the following formulas:

$$l = k1 \times IL1 + k2$$

$$\theta = k3 \times IL1 + k4$$

wherein k1, k2, k3 and k4 are coefficients previously determined with spacers having known dimensions.

The spacer exhibiting a height h corresponding, according to a cross section, to the distance separating the upper edge of the spacer in contact with the lateral edge of the parallel stripe and the substrate surface, and the algebraic value d corresponding to the difference between the height h and the thickness e of the parallel stripe, the algebraic value d is deducted by the following formula:

$$d = k5 \times IL1 + k6,$$

wherein k5 and k6 are coefficients previously determined with spacers having known dimensions.

BRIEF DESCRIPTION OF THE DRAWINGS

The foregoing and other objects, features and advantages of the invention will be apparent from the following detailed description of a preferred embodiment as illustrated in the accompanying drawings wherein.

DETAILED DESCRIPTION OF THE INVENTION

FIG. 1 schematically shows the structure that is to be carried out before the etching operation intended to form spacers. In a substrate 1, generally constituted by a wafer of semiconductive material, a layer of a first material is deposited, with a thickness e. Then, an anisotripic etching operation, known per se, is carried out for realizing, from the layer previously deposited, patterns 2 exhibiting a rectangular cross section. Thus, on the whole surface of the wafer, a layer 3 of a second material is deposited with a thickness f. Layer 3 can be deposited through sputtering or chemical vapour deposition (CVD) process. The upper surface 4 of layer 3 is horizontal in the areas located on the horizontal underlying areas, and inclined in the transitory areas corresponding to a step passage.

Figure 1A:
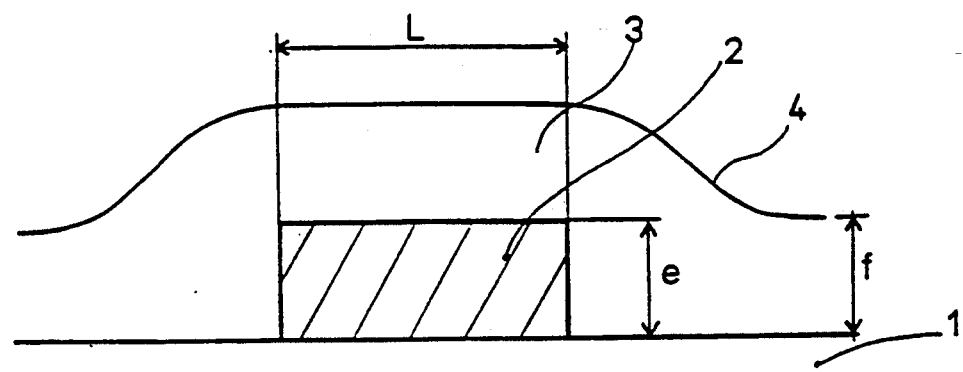
FIG. 1A is a schematic cross section view of the layers existing before the etching operation designed to form spacers.
Figure 1B:
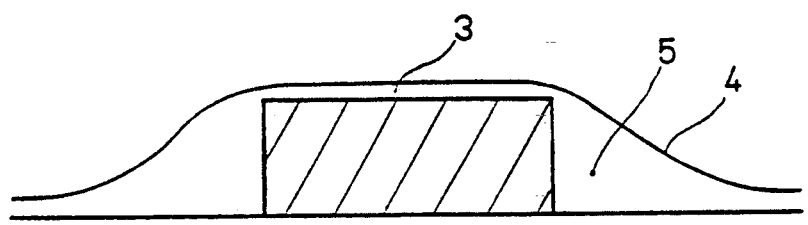
FIG. 1B is a schematic cross section view of the same structure as in FIG. 1A but at an intermediate state of the etching operation designed to form spacers.

Then, an anisotropic etching is carried out through any known process. In a first step of this etching, as shown in FIG. 1B, the profile of the upper surface 4 of layer 3 remains substantially unchanged. In this etching phase, the profile is said to be transferred. Then, the thickness of layer 3 is substantially reduced in the horizontal areas and there is a relatively significant presence of material of layer 3 in the step region 5, that is, in the areas where the upper surface 4 of layer 3 is highly inclined.

Figure 1C:
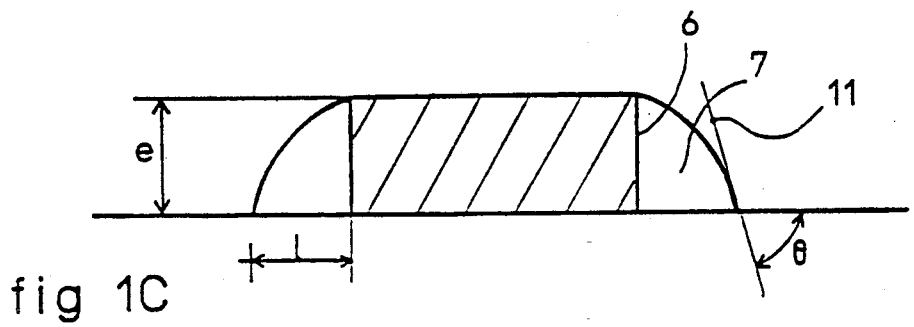
FIG. 1C is a schematic cross section view of the same structure at a more advanced etching step.

If etching is carried on, layer 3 is entirely removed in all the horizontal areas, and there only remains narrow and independent stripes, constituted by the material of layer 3, extending along the vertical lateral edges 6 of patterns 2. These narrow stripes 7 are called spacers. FIG. 1C shows this etching step during which spacers 7 are formed.

Figure 1D:
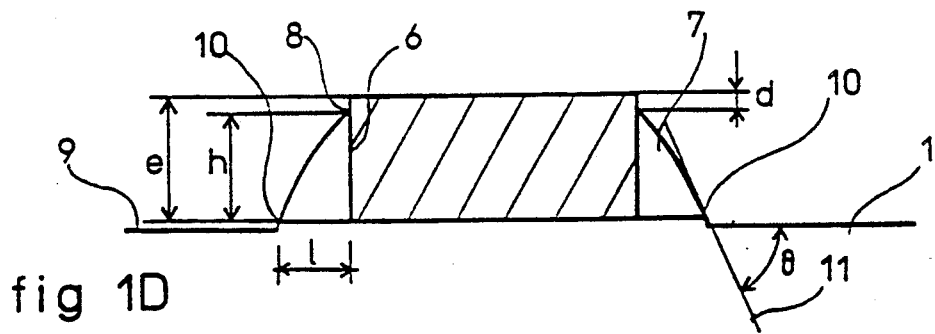
FIG. 1D is a schematic cross section view of the same structure at a still more advanced etching stage, corresponding to the appropriate formation of spacers.
Figure 1E:
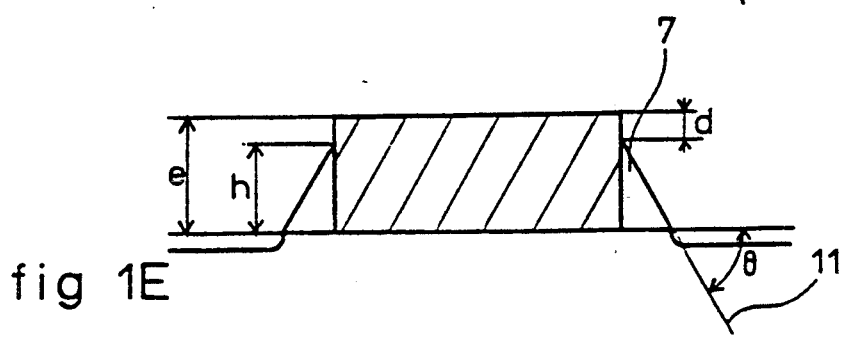
FIG. 1E is a schematic cross section view of the same structure resulting from overetching of spacers.

It is possible to compensate for non-homogeneous deposition and etching by continuing the etching operation until the step shown in FIG. 1D. If etching is further carried out, the thickness of spacer 7 is reduced, its height h is substantially lowered and its width l is reduced too, as shown in FIG. 1E. If etching is still further carried out, spacer 7 (not shown) can be entirely eliminated. It is to be noted that if etching is further carried on, this will cause etching of substrate 1.

During the manufacturing of integrated circuits, the major difficulty encountered for forming spacers is that it is necessary to stop the etching operation at a precise time in order to form a spacer having the desired shape (such as shown in FIG. 1D). Moreover, numerous other factors are liable to generate differences in the formation of spacers 7. If the initial thickness f of layer 3 is slightly too high or too low, the spacer 7 resulting from etching will not meet requirements. If, on the other hand, the material constituting layer 3 exhibits features slightly different from the ones considered as being normal, this material may cause a too high or too low etching rate, also forming inappropriate spacers 7. The etching process itself may also be submitted to non-desired variations resulting from misadjustments of machines or equipments. It is clear that an accurate and reliable control of the spacer dimensions is of the utmost importance. It is also clear that it is desirable that this dimension control of spacers 7 be very rapidly carried out in order to avoid manufacturing too many improper parts during the period of time elapsing between the manufacturing and the test results. It can also be seen that it will be very advantageous to be able to control the dimensions of spacer 7 during the etching operation itself, that is, to be able to control parts in situ. The invention, as will be seen in the following description, permits meeting these requirements.

Before describing in more detail the process according to the invention, the various physical values representative of the cross section shape of spacer 7 will be more precisely described with reference to FIG. 1D. The cross section of spacer 7 has a roughly triangular shape, whose side opposite to the right angle is slightly convex. This feature is not essential to understand the object of the invention. Beside, in some spacer manufacturing processes, this one may have slightly different shapes. However, in all spacers manufactured nowadays, this roughly triangular shape is found and it is always possible to define the three characteristics values h, l and θ as follows:

the height h of spacer 7 corresponds to the distance separating the upper edge 8 of the spacer, contacting the vertical lateral edge 6 of pattern 2, from the upper plane surface 9 of substrate 1;

the width l is equal to the distance separating the lateral edge 6 of pattern 2, at its contact point with the substrate 1 from the external edge 10 of spacer 7, at its contact point with substrate 1; and the angle θ is the angle formed by the tangent 11 at the external edge 10 of the spacer, at its contact point with the substrate 1.

In addition, the difference in height d is calculated according to the following algebraical formula:

$$d = h - e.$$

Figure 2:
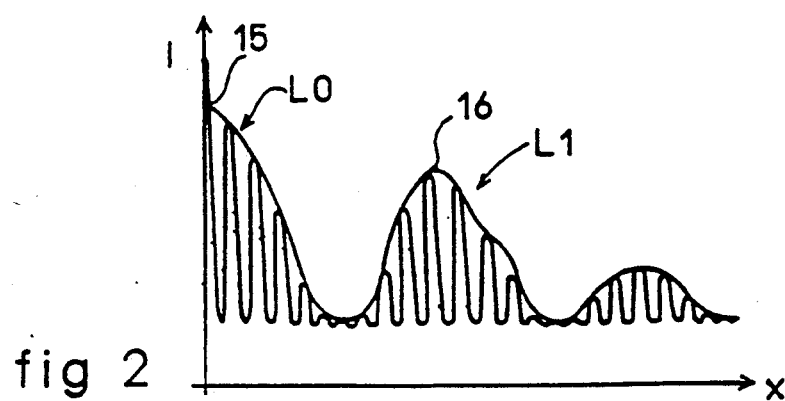
FIG. 2 shows the diffraction pattern obtained when implementing the invention.
Figure 3:
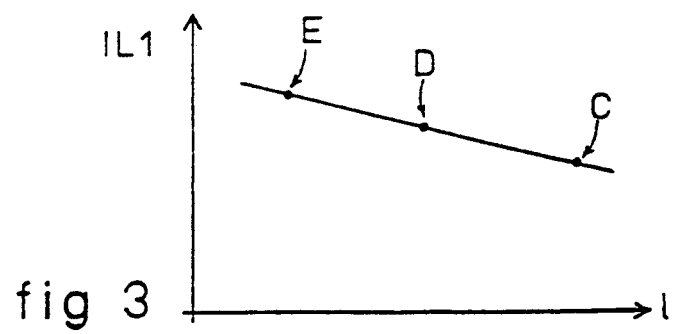
FIG. 3 shows the curve establishing the linear relationship between the spacer width and the light intensity measurement according to the invention.
Figure 4:
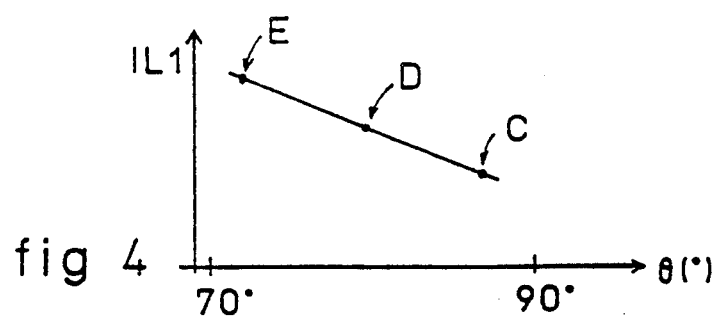
FIG. 4 shows the curve establishing the linear relationship between the angle θ and the light intensity measurement according to the invention.

Now, referring to FIGS. 2, 3 and 4, the measurement process according to the invention will be disclosed in more detail.

When spacers are manufactured on wafers intended to subsequently constitute integrated circuits, there always are, on some regions of these wafers, areas free from integrated circuits, essentially serving for various test and control operations.

In one of these free areas, it is always possible to provide for some specific structures which are simultaneously formed with the corresponding operations designed to manufacture integrated circuits. In one at least of these free areas, an array of parallel stripes is formed during the same technological steps as those intended to form microstructures in circuits, on the edges 6 of which spacers are to be formed. Thus, an array of parallel stripes 2 is formed in a first material corresponding to the material of these microstructures. Each parallel stripe exhibits a roughly rectangular cross section. It can be considered that FIGS. 1A-1E represent either microstructures of integrated circuits on which it is desired to associate spacers 7 or parallel stripes forming an array to which it is also desired to provide spacers 7 designed to control dimensions. Then, according to the invention, spacers are formed on the lateral edges 6 of the parallel stripes 2. For this purpose, the steps described in relation with FIG. 1 are carried out. During the anisotropic etching operation, or once this etching operation is completed, the array 2 is lighted by a monochromatic light beam. As shown in FIG. 2, the diffracted light produces a diffraction pattern constituted by a main light spot 15 corresponding to the specular reflection and a multiplicity of aligned and adjacent diffraction spots, the envelope of which exhibits a major lobe L0 including the main spot 15 and secondary lobes among which the first lobe L1 is adjacent to the major lobe L0. According to the invention, the light intensity of the spots constituting the first lobe L1 is measured. It is possible, either to measure the light intensity of the brightest spot 16 of the first lobe L1, or to sum up the measurements of the light intensities of a predetermined number of spots pertaining to the first lobe L1, the considered spots not necessarily corresponding to the brightest spots of this first lobe L1. It is also possible to take into account all the spots included in the first lobe L1, that is, to measure the overall light intensity of the first lobe L1. In fact, a group of spots of lobe L1, the light intensity of which substantially varies with the etching degree of the spacer, will preferably be selected.

The invention is based on the observation made by the Applicant according which it is possible to deduct this measurement of light intensity IL1 from one or several spots of the first lobe L1, width l, angle $\theta$ as well as the difference in height d, by comparison with calibration curves.

It has been assessed that the light intensity IL1 of the first lobe L1 is in linear relationship, both with the width l of spacer 7, the angle $\theta$ of spacer 7 and the difference in height d when the latter is negative, that is, when the height h of spacer 7 is lower than the thickness e of the parallel stripes 2.

FIG. 3 shows the linear relationship between the measurement of the light intensity IL1 and the width l of the spacer. It can be seen that the light intensity of lobe L1 increases when the width l of spacer 7 decreases. Therefore, it is easy, through preliminary experimental measurements or through simulation, to determine the linear function correlating l and IL1 by a formula such as:

$$l = k1 \times IL1 + k2$$

wherein k1 and k2 are two constants.

FIG. 4 shows the linear relationship between parameter IL1 and $\theta$. In the same way, the following formula can be established:

$$\theta = k3 \times IL1 + k4,$$

wherein k3 and k4 are two constants.

Figure 5:
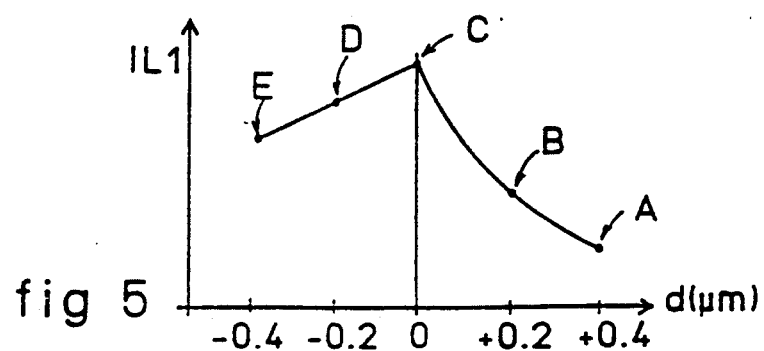
FIG. 5 shows the curve establishing the relationship between the distance d and the light intensity measurement according to the invention.

FIG. 5 shows the evolution of the algebraic value d during the etching operation as a function of the light intensity of a determined group of spots pertaining to the first lobe 1. The very beginning of the etching operation, corresponding to mark A, corresponds to FIG. 1A. Mark B of FIG. 5 corresponds to the etching level of FIG. 1B, and so forth for marks C, D and E. Similarly, in FIGS. 3 and 4, marks C, D and E correspond to the etching level shown in FIGS. 1C, 1D and 1E, respectively.

Referring again to FIG. 5, it can be noted that, for the group of spots chosen in this specific example, at the start of etching, corresponding to marks A, B and C, the light intensity IL1 has increased until the etching reaches the state represented in FIG. 1C, that is, at the time when the horizontal areas of layer 3 are entirely removed. If the etching is carried on, by successively passing through the states shown in FIGS. 1D and 1E, it can be seen that the light intensity IL1 linearly progresses as a function of the algebraic value d. Hence, in the range C, D and E, it is possible to similarly determine a linear function between the light intensity IL1 and the value d, according to the following formula:

$$d = k5 \times IL1 + k6,$$

where k5 and k6 are constants.

In order to determines constants k1–k6, a calibration will be previously carried out on spacers having known shapes and dimensions, determined, for example, through electronic microscopy.

On the other hand, it will be noted that, at the time when the horizontal areas of layer 3 are entirely etched, that is, as for the circuit shown in FIG. 1C, the light intensity IL1 reaches a maximum value, that is easily detectable through conventional measurement means. Therefore, it is easy to determine this precise time corresponding to point C and so to realize a means for detecting the end of etching.

It will be noted that, in order to obtain a satisfactory means for detecting the end of etching, it is necessary to select a group of spots of the first lobe L1 so that the intensity IL1 reaches an optimum value for the etching level corresponding to point C.

The invention can easily be implemented with an appropriate apparatus (not shown).

This apparatus essentially comprises a monochromatic light source, generally a laser source, which hits, according to a determined incidence angle, the array of parallel stripes. The apparatus also comprises a detector which is arranged close to the diffraction spots and which can be constituted, for example, by a CCD array. Then, the apparatus comprises, in a way known per se, a set of electronic devices which permit localizing the various light spots, localizing the spot 15 corresponding to the specular reflection, counting the various spots and localizing the first lobe L1 and, in this lobe L1, the brightest spot 16. The device is then capable of measuring intensities IL1 corresponding to the above described process and to make very simple calculations for directly printing the values of parameters l, $\theta$ and d.

We claim:

1. A process for measuring the dimensions of a spacer comprising:

forming on a substrate an array of parallel stripes, each stripe having a rectangular cross section;

forming spacers on the lateral edges of said parallel stripes, said spacers exhibiting, according to a cross section, a width l corresponding to the distance separating the edge of the stripe from the external edge of the spacer at their contact point with the substrate, and an angle $\theta$ formed, with the substrate plane, by the tangent to the external edge of the spacer at the substrate;

during the manufacturing step of spacers or following this step, lighting the array through a monochromatic light beam, the diffracted light of which supplies a diffraction pattern comprised of a main light spot corresponding to the specular reflection and of a multiplicity of aligned and adjacent diffraction spots, the envelope of which exhibits a major lobe (L0) including the main spot and secondary lobes among which the first lobe (L1) is adjacent to the major lobe (L0);

measuring the sum of light intensities (IL1) of a predetermined number of spots pertaining to said first lobe (L1);

deducting therefrom the width l and angle $\theta$ of the spacer according to the following formulas:

$$l = k1 \times IL1 + k2$$

$$\theta = k3 \times IL1 + k4$$

wherein k1, k2, k3 and k4 are coefficients previously determined with spacers having known dimensions.

2. A process for measuring the dimensions of a spacer according to claim 1, wherein the spacer further exhibits a height h corresponding, according to a cross section, to the distance separating the upper edge of the spacer contacting the lateral edge of the parallel stripe and the surface of the substrate and wherein the algebraic value d corresponds to the difference between the height h and the thickness e of the parallel stripe, wherein the algebraic value d is deducted by the following formula:

$$d = k5 \times IL1 + k6,$$

wherein k5 and k6 are coefficients previously determined by comparison with spacers having known dimensions.

* * * * *